United States Patent
Kagi et al.

(10) Patent No.: US 6,636,659 B2
(45) Date of Patent: Oct. 21, 2003

(54) OPTICAL AMPLIFICATION APPARATUS AND OPTICAL TRANSMISSION SYSTEM

(75) Inventors: Nobuyuki Kagi, Tokyo (JP); Koji Yamanaka, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 66 days.

(21) Appl. No.: 09/985,752

(22) Filed: Nov. 6, 2001

(65) Prior Publication Data

US 2002/0054733 A1 May 9, 2002

(30) Foreign Application Priority Data

Nov. 7, 2000 (JP) .................................... 2000-338748
May 14, 2001 (JP) .................................... 2001-143737
Oct. 9, 2001 (JP) .................................... 2001-311969

(51) Int. Cl.[7] ................................................ H01S 3/00
(52) U.S. Cl. .................... 385/24; 359/334; 359/345; 359/341.3; 359/341.4
(58) Field of Search .................... 385/24; 359/333–334, 359/345, 341.1–341.42, 160

(56) References Cited

U.S. PATENT DOCUMENTS 6,292,288 B1 * 9/2001 Akasaka et al. ............ 359/334

FOREIGN PATENT DOCUMENTS

JP 2000-98433 4/2000
JP 2000-299522 10/2000

* cited by examiner

*Primary Examiner*—Akm Enayet Ullah
*Assistant Examiner*—Jerry T. Rahll
(74) *Attorney, Agent, or Firm*—Oblon, Spivak, McClelland, Maier & Neustadt, P.C.

(57) ABSTRACT

An optical amplification apparatus estimates a gain deviation over a range of multiplex wavelength of a signal light received from an EDFA in the preceding stage, selects a gain profile, with which the gain deviation becomes a minimum, from a gain profile storage section, and determines the gain profile. This optical amplification apparatus further controls an HPU (High power pumping light source) according to the determined gain profile and performs Raman amplification on the received signal light.

10 Claims, 10 Drawing Sheets

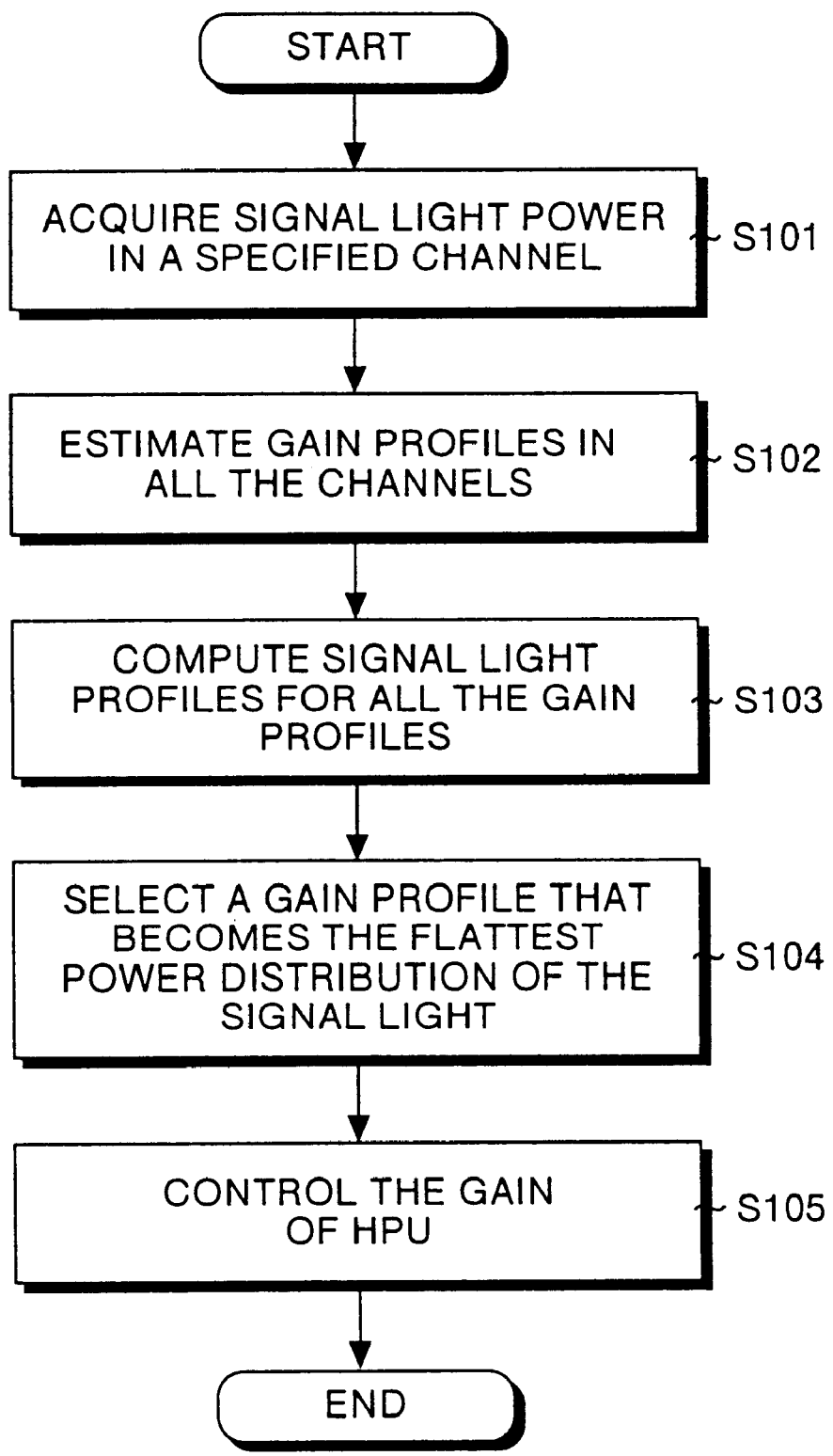

FIG.6
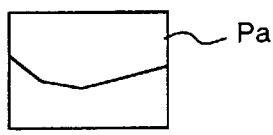
Pa
| PUMPING POWER (mW) | | | | | | Ta |
|---|---|---|---|---|---|---|
| LD1 | LD2 | LD3 | LD4 | LD5 | LD6 | |
| 100 | 50 | 100 | 100 | 150 | 150 | |
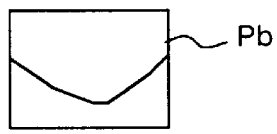
Pb
| PUMPING POWER (mW) | | | | | | Tb |
|---|---|---|---|---|---|---|
| LD1 | LD2 | LD3 | LD4 | LD5 | LD6 | |
| 150 | 100 | 50 | 100 | 100 | 150 | |
Pc
| PUMPING POWER (mW) | | | | | | Tc |
|---|---|---|---|---|---|---|
| LD1 | LD2 | LD3 | LD4 | LD5 | LD6 | |
| 100 | 100 | 100 | 50 | 150 | 200 | |
GAIN PROFILE

OUTPUT SPECTRUM AT THE OUTPUT PORT PA

OUTPUT SPECTRUM AT THE OUTPUT PORT PB

OPTICAL AMPLIFICATION APPARATUS AND OPTICAL TRANSMISSION SYSTEM

FIELD OF THE INVENTION

The present invention relates to an optical amplification apparatus and an optical transmission system capable of realizing long distance transmission with higher stability and reliability by compensating for a signal light distorted in an EDFA through Raman amplification so as to become the most adequate input power for the EDFA.

BACKGROUND OF THE INVENTION

There has been a problem on increasing data traffic caused by increased number of callings in communications and a larger amount of contents data such as moving pictures under such situations as recent rapid penetration of the Internet and sharply increased accesses between intra corporate LANs. Therefore, a WDM (Wavelength Division Multiplexing) system is remarkably progressing and becoming rapidly widespread in order to prevent reduction of communication performance due to increased data traffic.

The WDM system has realized high-capacity transmission that is 100 times as high as conventional transmission through a line of fiber by superposing a plurality of optical signals on different wavelengths. Particularly, the existing WDM system uses an erbium-doped fiber amplifier (hereafter EDFA) to enable broadband long distance transmission. The EDFA mentioned here indicates an amplifier to which the principle as follows is applied. This principle is that light having a wavelength of 1550 nm-band as a transmission signal is amplified in a specified fiber when a pumping laser having a wavelength of 1480 nm or 980 nm is passed through the specified optical fiber obtained by doping an element such as erbium into the fiber.

FIG. 9 is a block diagram showing a schematic structure of the conventional WDM system. As shown in FIG. 9, the conventional WDM system has EDFAs (100, 110) in each predetermined zone on a transmission line 99 based on an optical fiber as a transmission medium. The signal light passing through the transmission line 99 is amplified by these EDFAs to maintain the lowest possible power required only for being recognized as information.

Each of the EDFAs (100, 110) generally comprises an erbium-doped fiber, pumping laser for pumping the erbium-doped fiber, optical isolator, and the optical filter (not shown).

The EDFAs (100, 110) for performing such multiple wavelength amplification are required to have a flat gain profile over a multiplexed wavelength band so that the degree of amplification is prevented from being different in each wavelength. That is, the EDFAs (100, 110) are desired to minimize a gain deviation of each signal light in the multiplexed wavelength band.

Therefore, generally, in the EDFAs (100, 110), gain specification is in many cases optimized by a gain equalization filer or the like so as to show the flattest gain profile with respect to a signal light having a specified signal light power. FIG. 10 shows a diagram for explaining a gain profile in the conventional EDFA. In FIG. 10, gain profiles in a case where the signal light power is −17 dBm and a case where it is −25 dBm are shown. Particularly, this EDFA is adjusted so that the uniform gain can be obtained over wavelengths of 1540 nm to 1580 nm when the signal light power of −17 dBm is received. On the other hand, when the signal light power of −25 dBm is received, a gain deviation on the short wavelength side is large as compared to the case where the signal light power of −17 dBm is received. Therefore, uniform gain cannot be obtained.

Accordingly, the WDM system using the EDFA is desired to design the power of the signal light to be input into the EDFA so that the gain profile of the EDFA becomes the flattest.

However, the WDM system for an ultra long distance such that the number of repeaters exceeds 100 has a problem that a gain band is narrowed because a gain deviation is accumulated as the number of repeating stages increase even if the gain deviation in the EDFA is a small amount.

FIG. 11A and FIG. 11B are diagrams for explaining the above-mentioned problems. FIG. 11A shows an output spectrum at an output port PA of the EDFA 100 in the first stage shown in FIG. 9, and FIG. 11B shows an output spectrum at an output port PB of the EDFA 110 in the following stage shown in FIG. 9. As shown in FIGS. 11A and 11B, even the signal light having the same information is output as the signal light having a different power distribution between the outputs of continuously disposed EDFAs. This is because the signal light power is not amplified perfectly flatly over multiple wavelengths due to the fine gain deviation, and in addition, the signal light is deviated from the most appropriate power by the gain deviation, so that the signal light cannot undergo amplification by a flat gain profile in the next EDFA.

The EDFA in particular cannot avoid production of ASE (Amplified Spontaneous Emission) noise. Therefore, as shown in FIG. 11A, the signal light spectrum together with the ASE component 120 undergoes amplification by the same gain profile. Accordingly, as shown in FIG. 11B, the ASE component 130 is also affected by the gain deviation.

The EDFA is a lumped amplifier in which parts pumping the optical signal are concentrated. Therefore, this lumped amplifier has such restriction that it undergoes propagation loss along an optical fiber as a transmission line leading to accumulation of noise, and non-linearity that may cause signal distortion and noise. Further, the EDFA enables optical amplification in a wavelength band defined by band gap energy of erbium. Therefore, the EDFA has difficulty in working on a wider band required for further multiplexing.

To solve the problem, a Raman amplifier has been focused on as an optical amplifier instead of the EDFA. The Raman amplifier is a distributed optical amplifier that does not require a specific fiber such as an erbium-doped fiber like the EDFA and uses an ordinary optical fiber for a transmission line as a gain medium.

However, a WDM system using this Raman amplifier also has problems as follows because at least two pumping light sources provided in the respective Raman amplifiers are always operated in constant output power.

(1) In Raman amplification, a transmission line through which a signal light is transmitted is used as a medium for amplification. Therefore, amplification characteristics of the medium depend on a type of transmission line (optical fiber). For example, an SMF (Single Mode optical Fiber) has an efficiency (Raman gain/pumping light power) by one-half as compared to that of a DSF (Dispersion Shifted Optical Fiber). Therefore, when the type of optical fiber forming the transmission line is changed while output power of the pumping light source is kept constant, the amplification characteristics of the transmission line are changed to be incapable of maintaining sufficient transmission quality if the characteristics remain changed.

(2) In Raman amplification, a transmission line through which a signal light is transmitted is used as a medium for amplification. Therefore, amplification characteristics of the medium also depend on transmission loss of the transmission line (optical fiber). Therefore, when the transmission loss of the optical fiber forming the transmission line fluctuates while output power of the pumping light source is kept constant, the amplification characteristics of the transmission line also fluctuate to be incapable of maintaining sufficient transmission quality. Further, when the transmission loss of the transmission line becomes larger, not only the signal light undergoes a large loss but also the pumping light undergoes a large loss, which makes the Raman gain decreased. Therefore, the fluctuation in the signal light power becomes larger than the fluctuation in the loss of the transmission line.

(3) When a wavelength multiplexed optical signal is subjected to Raman amplification, the amplification gain depends on the number of wavelengths (number of channels) of the signal light and optical power for each signal light in each wavelength. Therefore, when the number of channels of the signal light is increased or decreased while output power of the pumping light source is kept constant, the amplification characteristics fluctuate to be incapable of maintaining sufficient transmission quality.

According to the particularly recent studies, it is found that the most adequate system architecture can be built by not using the Raman amplifier as a single unit but by using it together with the EDFA. Therefore, the transmission capacity of this system can be expected to be improved by several times to ten times or more as compared to the system using only the EDFA. However, the WDM system using the Raman amplifier has not been established yet and is still in a stage of studying on how it is introduced.

SUMMARY OF THE INVENTION

It is an object of this invention is to provide an optical amplification apparatus and an optical transmission system capable of realizing long distance transmission with higher stability and reliability by flattening a signal light distorted over multiple wavelengths due to passing through EDFAs and a transmission line by Raman amplifiers.

In order to achieve the object, according to one aspect of this invention, a signal light having non-uniform power between wavelengths due to gain deviation can be corrected by Raman amplification so as to be flat.

According to another aspect of this invention, by providing an estimation unit and a gain profile determination unit in a Raman amplifier of a distributed amplification type, an incident signal light can be amplified so as to become a flat gain profile over a multiplexed wavelength.

According to still another aspect of this invention, a signal light having a flat signal light power obtained by suppressing a gain deviation to a minimum through Raman amplification based on distributed amplification can be input to a lumped amplifier.

Further, by providing an estimation unit and a gain profile determination unit in a Raman amplifier of a distributed amplification type, the signal light to be input to the lumped amplifier can be amplified so as to become a flat gain profile over the multiplexed wavelength.

According to still another aspect of this invention, a signal light whose gain deviation is suppressed to a minimum through Raman amplification based on backward pumping can be input to a lumped amplifier in the next stage.

Further, it is possible to compensate for distortion of the signal light due to gain deviation caused by an erbium-doped fiber amplifier.

According to still another aspect of this invention, by providing an estimation unit and a gain profile determination unit in a Raman amplifier of a distributed amplification type, a signal light to be propagated on a transmission line can be amplified so as to become a flat gain profile over a multiplexed wavelength.

Further, as a unit for transmitting a deviation of an estimated power distribution of the signal light from a first optical amplification apparatus to a second optical amplification apparatus, a system composed of an OSC transmitter and an OSC receiver can be utilized.

According to still another aspect of this invention, even if a type of optical fiber as a transmission medium of a signal light and also as a amplification medium of the signal light may be changed or transmission loss may fluctuate or even if the number of wavelengths of a transmitted signal light and light power of each signal light in each wavelength may fluctuate, preferred or the most adequate amplification characteristics can be always ensured and sufficient transmission quality can be maintained by changing the wavelengths of a pumping light and pumping light power according to their fluctuations.

Other objects and features of this invention will become understood from the following description with reference to the accompanying drawings.

BRIEF DESCRIPTION OF THE DRAWINGS

FIG. 4 is a flow chart for explaining operation of the optical amplification apparatus and the optical transmission system according to the first embodiment;

FIG. 6 shows an example of "Gain profile table" stored in the optical amplification-apparatus and the optical transmission system according to the first embodiment;

DETAILED DESCRIPTION

Preferred embodiments of the optical amplification apparatus and the optical transmission system according to this invention will be explained in detail below with reference to the drawings. It should be noted that this invention is not limited by these embodiments.

Figure 1:
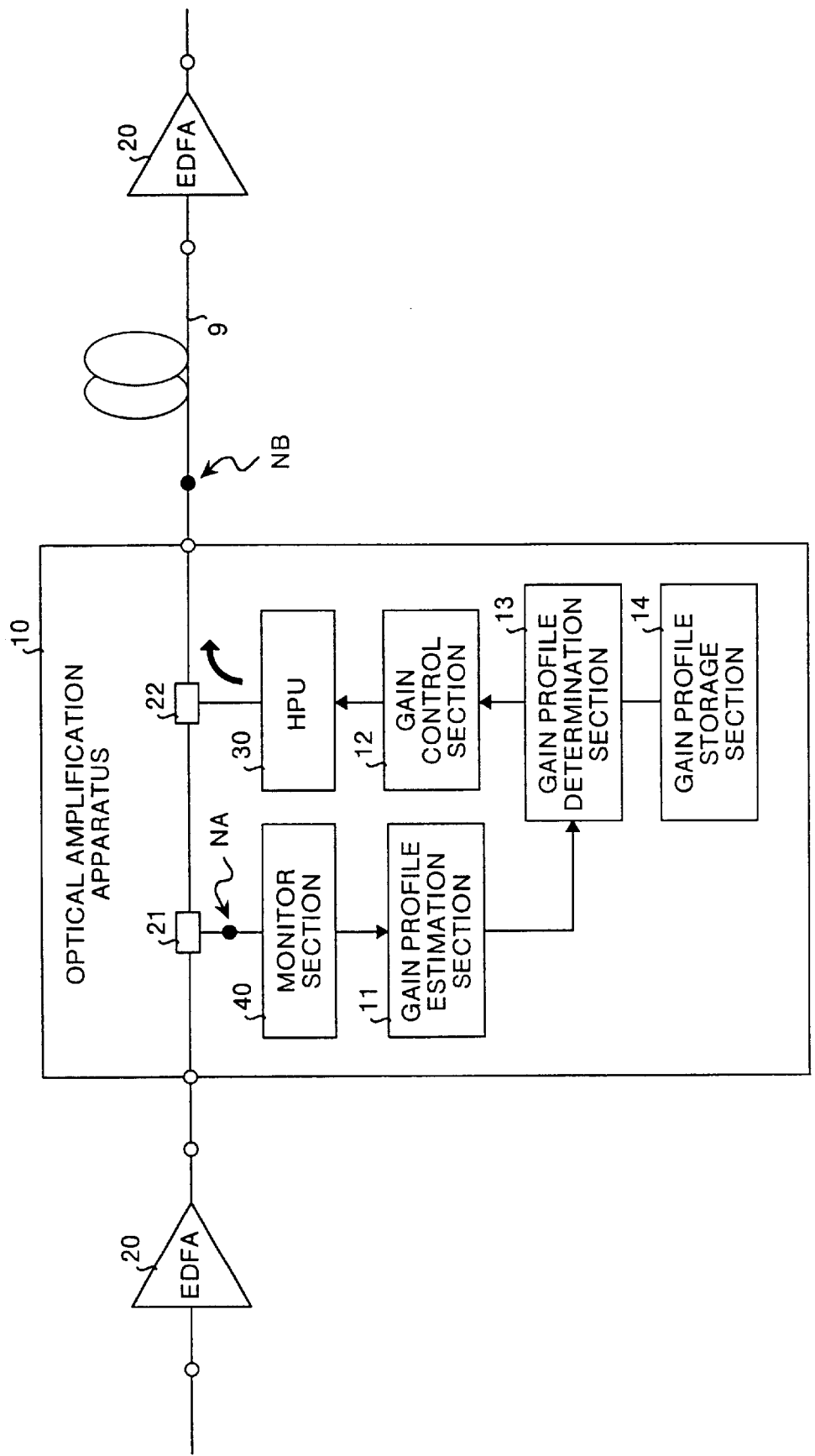
FIG. 1 is a block diagram showing a schematic structure of an optical amplification apparatus and an optical transmission system using the optical amplification apparatus according to a first embodiment of this invention.

An optical amplification apparatus and an optical transmission system using the optical amplification apparatus according to a first embodiment are explained. FIG. 1 is a block diagram showing a schematic structure of the optical amplification apparatus and optical transmission system using the optical amplification apparatus according to the first embodiment. The optical transmission system comprises the EDFAs 20 each amplifying a signal light on the transmission line 9 and the optical amplification apparatus 10 that performs distributed optical amplification based on Raman amplification.

The optical amplification apparatus 10 comprises the optical tap 21, monitor section 40, gain profile estimation section 11, gain profile determination section 13, gain control section 12, gain profile storage section 14, optical multiplexer 22, and the HPU 30.

Figure 2:
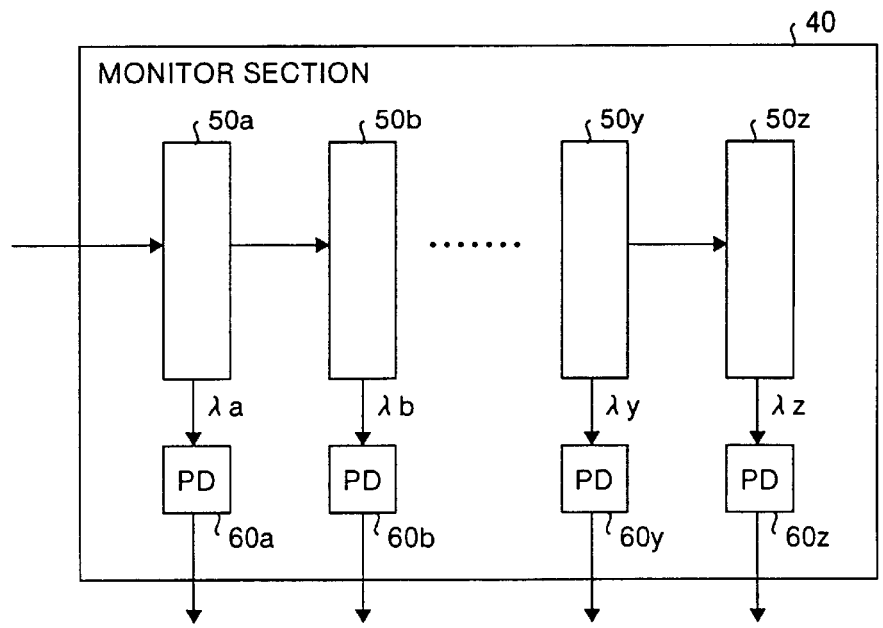
FIG. 2 shows a structural example of a monitor section for the optical amplification apparatus according to the first embodiment.

The monitor section 40 is a unit that receives a signal light demultiplexed by the optical tap 21 and detects the power of the signal light, and comprises light-receiving devices such as photodiodes. FIG. 2 shows a structural example of the monitor section 40. The monitor section 40 comprises a plurality of narrow band filters 50a, 50b, ... 50y, and 50z that successively receive signal lights demultiplexed by the optical tap 21, and light-receiving devices 60a, 60b, ..., 60y, and 60z each of which receives the signal light having passed through the respective narrow band filters. Particularly, this monitor section 40 demultiplexes the multiplexed signal light into those in each channel, that is, signal lights λa, λb, ... λy, and λz by the plural narrow band filters 50a, 50b, ..., 50y, and 50z, extracts them, and detects signal light power for each extracted signal light.

The gain profile estimation section 11 is a unit that receives monitor information (power distribution of signal light) showing signal light power in all of or a part of wavelengths detected by the monitor section 40, and estimates a gain profile in the multiplexed wavelength band from the received power distribution of the signal light. The gain profile mentioned here indicates how the power distribution of a signal light propagating through the transmission line 9 is changed. That is, the gain profile indicates how the power distribution of the signal light over a range of specified wavelengths is changed as compared to a case where the distribution is flat in the range of the wavelengths. In other words, the gain profile estimation section 11 estimates by how degree of gain deviation the multiplexed signal light has been amplified.

The gain profile determination section 13 is a unit that selects a gain profile so as to cancel out the deviation of the gain profile estimated by the gain profile estimation section 11 from "Gain profile table" stored in the gain profile storage section 14, and determinates the profile.

The gain control section 12 is a unit that controls output power of each laser unit of the HPU 30 according to gain control parameters indicated by the gain profile determined by the gain profile determination section 13, and comprises an APC (Automatic laser output control circuit) The HPU 30 is a unit that outputs a pumping light with a gain according to the control by the gain control section 12.

Figure 3:
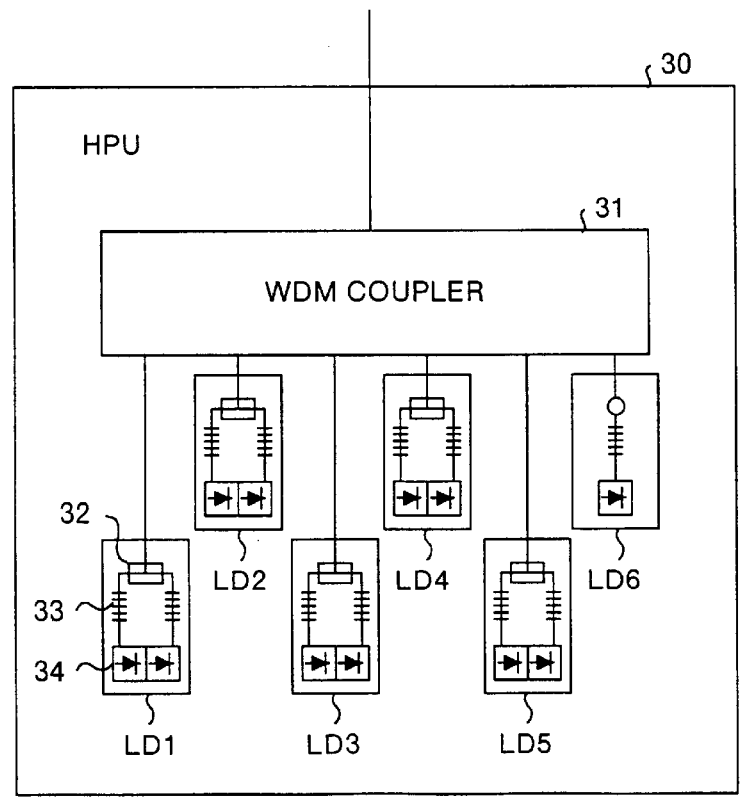
FIG. 3 shows a structural example of HPU for the optical amplification apparatus according to the first embodiment.

FIG. 3 shows a structural example of the HPU 30. The HPU 30 comprises the six laser units LD1 to LD6 in each of which a central wavelength of oscillation of laser is different, and a Mach-Zehnder WDM coupler 31. Each of the laser units LD1 to LD6 has two Fabry-Perot type semiconductor lasers 34 having the same central wavelength of laser oscillation, stabilizes the wavelengths of laser outputs of the semiconductor lasers 34 by fiber Bragg gratings 33 (FBG), and couples the laser outputs into one output by a polarization beam coupler (PBC) 32. Polarization beam coupling by this PBC 32 is a measure to increase pumping power of each central wavelength of laser oscillation and reduce polarization dependency of Raman gain. The example using the fiber Bragg grating is one of means to stabilize the wavelengths of laser outputs, and wavelength stabilization may be performed by some other means.

The laser outputs from the laser units LD1 to LD6 are further coupled by the WDM coupler and are output as a multiplexed high power pumping light. The pumping light output from the HPU 30 passes through the optical fiber as the transmission line 9 through the optical multiplexer 22. FIG. 1 shows an example of forward pumping, in which the pumping light multiplexed by the optical multiplexer 22 travels through the transmission line 9 toward the proceeding direction the same as that of the signal light.

Through traveling of the high power pumping light within the transmission line 9, Raman scattered light is produced. This Raman scattered light shifts to a long wavelength side by 110 nm from the pumping light based on material characteristics of the optical fiber as the transmission medium, and the energy of the pumping light is transferred to the signal light through induction Raman scattering processes. Accordingly, the signal light is amplified.

The operation of the optical amplification apparatus and the optical transmission system according to the first embodiment will be explained below. FIG. 4 is a flow chart for explaining the operation of the optical amplification apparatus and the optical transmission system according to the first embodiment. In the optical amplification apparatus 10, the monitor section 40 detects a signal light propagating through the transmission line 9 and acquires a value of the signal light power (step S101).

Of the signal light propagating through the transmission line 9, the signal light power for signal lights in all the wavelengths forming the signal light may not be acquired. That is, the monitor section 40 acquires the signal light power in a part of the wavelengths (channels) forming the multiplexed signal light as shown in FIG. 2.

Figure 5A:
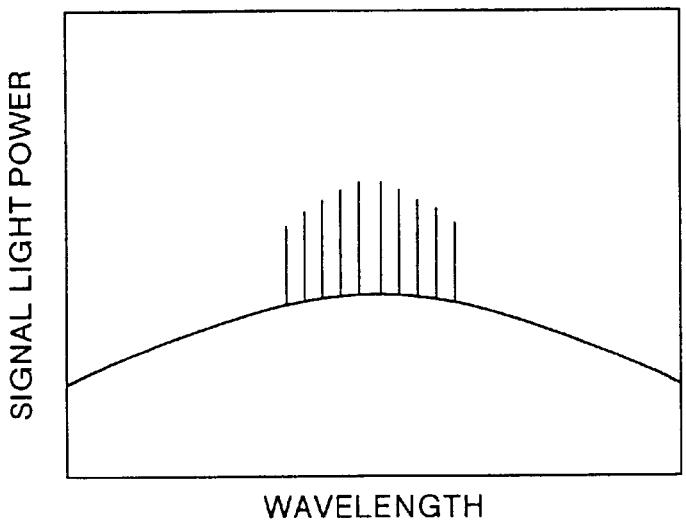
FIG. 5A to FIG. 5C show examples of power distribution of signal light in each node within the optical amplification apparatus according to the first embodiment.
Figure 5B:
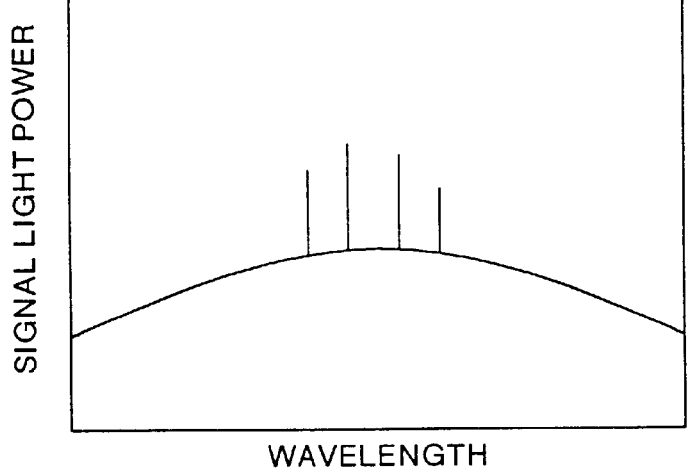
Figure 5C:
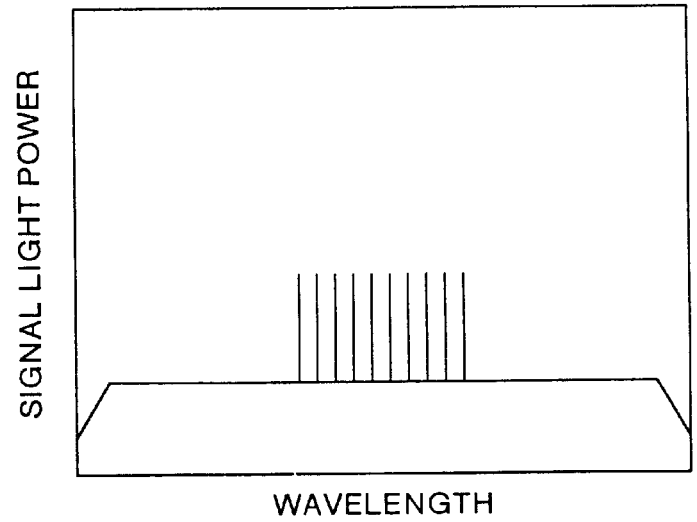

FIG. 5A to FIG. 5C show examples of signal light power distribution in nodes within the optical amplification apparatuses. It is assumed here as an example that when the number of multiplex wavelengths of the signal light is 10, the monitor section 40 extracts signal light power of four channels out of 10 to output the respective power to the gain profile estimation section 11. FIG. 5A shows power distribution (output spectrum) of the signal light immediately after the light is demultiplexed by the node NA, i.e. the optical tap 21 as shown in FIG. 1. As shown in FIG. 5A, the signal light in the previous stage, that is before being input into the monitor section 40, has a spectrum multiplexed by 10 wavelengths. Although it is ideal that respective intensity of these spectrums is equally flattened, it can be seen from this figure that these spectrums are affected by the gain deviation or the like of the EDFA 20 to produce variations.

FIG. 5B shows power distribution of the signal light (output spectrum) extracted by the monitor section 40. Only spectrums corresponding to specified four channels out of 10 channels, that form the multiplexed signal light, are extracted.

The gain profile estimation section 11 estimates a gain profile from the signal light power distribution formed only with the specified spectrums extracted by the monitor section 40 (step S102). That is, the gain profile estimation section 11 restores the signal light power distribution as shown in FIG. 5A from the signal light power distribution as shown in FIG. 5B, and further calculates the gain deviation from the restored signal light power distribution. In the explanation below, the gain profile estimated at step S102 is referred to as estimation gain profile.

The estimation gain profile estimated by the gain profile estimation section 11 is input into the gain profile determination section 13. The gain profile determination section 13 successively loads a plurality of gain profiles stored in the gain profile storage section 14.

FIG. 6 shows an example of "Gain profile table" stored in the gain profile storage section 14. More specifically, FIG. 6 shows three gain profiles Ta, Tb, and Tc as an example. In this figure, Pa, Pb, and Pc are graphs showing the respective gain profiles Ta, Tb, and Tc.

In FIG. 6, for example, the gain profile Ta is shown to instruct the laser units LD1 to LD6 within the HPU 30 to oscillate laser in pumping light power of 100 mW, 50 mW, 100 mW, 100 mW, 150 mW, and 150 mW in the above order. As explained above, the gain profile shows the power distribution of each pumping light of the laser units.

The gain profile determination section 13 extracts one of the gain profiles and computes through multiplication of the extracted gain profile by the estimation gain profile (step S103). The result of such computation indicates a new signal light power distribution obtained when amplification is performed on the signal light propagating through the transmission line 9 based on the extracted gain profile. The gain profile determination section 13 holds temporarily this computation result, extracts other gain profile, and repeats the same sequence.

When the computation for all the gain profiles stored in the gain profile storage section 14 is finished, the gain profile determination section 13 selects a gain profile, from the computation results, with which the flattest signal light power distribution can be obtained (step S104). When selecting the gain profile in such a manner, the gain profile determination section 13 inputs control signals for respective pumping light power indicated by the selected gain profile into the gain control section 12. The gain control section 12 changes each gain of the laser units LD1 to LD6 within the HPU 30 based on the received control signals (step S105).

Accordingly, the signal light, which has undergone Raman amplification by the node NB as shown in FIG. 1, i.e. the optical amplification apparatus 10 according to this embodiment, obtains flat signal light power over the wavelengths as shown in FIG. 5C.

If the optical amplification apparatus 10 fixes wavelengths to be detected in the monitor section 40, estimation by the gain profile estimation section 11 is only the way to acquire signal light power of other wavelengths. Particularly, in the optical transmission system provided with a plurality of optical amplification apparatuses 10 of this embodiment on the transmission line 9, when there is a large error between the actual signal light power and the estimated signal light power, the error is gradually emphasized as the signal light passes through the optical amplification apparatuses 10 on the further downstream side, and an accurate gain profile cannot possibly be determined. Accordingly, it is preferable that the monitor section 40 changes wavelengths (channels) as targets for detection in each optical amplification apparatus 10.

As explained above, according to the optical amplification apparatus of the first embodiment, a signal light is subjected to Raman amplification according to a gain profile such that power distribution of the signal light propagating through the transmission line 9 becomes flat over the multiplexed wavelength band. Therefore, it is possible to correct variations produced between the wavelengths due to gain deviation of the EDFA 20 or the like.

According to the optical transmission system of the first embodiment, by providing the optical amplification apparatus 10 between the EDFAs 20, a signal light having the signal light power, that keeps flat at any time over the multiple wavelengths, can be input into the EDFA 20 in the next stage. Therefore, it is possible to prevent the gain deviation from being accumulated as the number of repeating stages is increased like in the conventional art, and to make longer a transmission distance by combining Raman amplifications.

In the first embodiment, the optical amplification apparatus of this invention is provided in the optical transmission system using the EDFA to correct a signal light power. However, this optical amplification apparatus can be also applied to the optical transmission system structured with the lumped amplifier except the EDFA such as a semiconductor laser amplifier.

Further, the first embodiment provides the optical transmission system using the lumped amplifier such as the EDFA. However, the optical amplification apparatus according to this invention can be also applied to the optical transmission system without using the lumped amplifier that performs only Raman amplification.

An optical amplification apparatus and an optical transmission system using the optical amplification apparatus according to a second embodiment will be explained below. In the optical amplification apparatus and optical transmission system according to the first embodiment, the optical amplification apparatus performs Raman amplification based on frontward pumping. On the other hand, the optical amplification apparatus and optical transmission system according to the second embodiment are characterized in that the optical amplification apparatus performs Raman amplification based on backward pumping.

Figure 7:
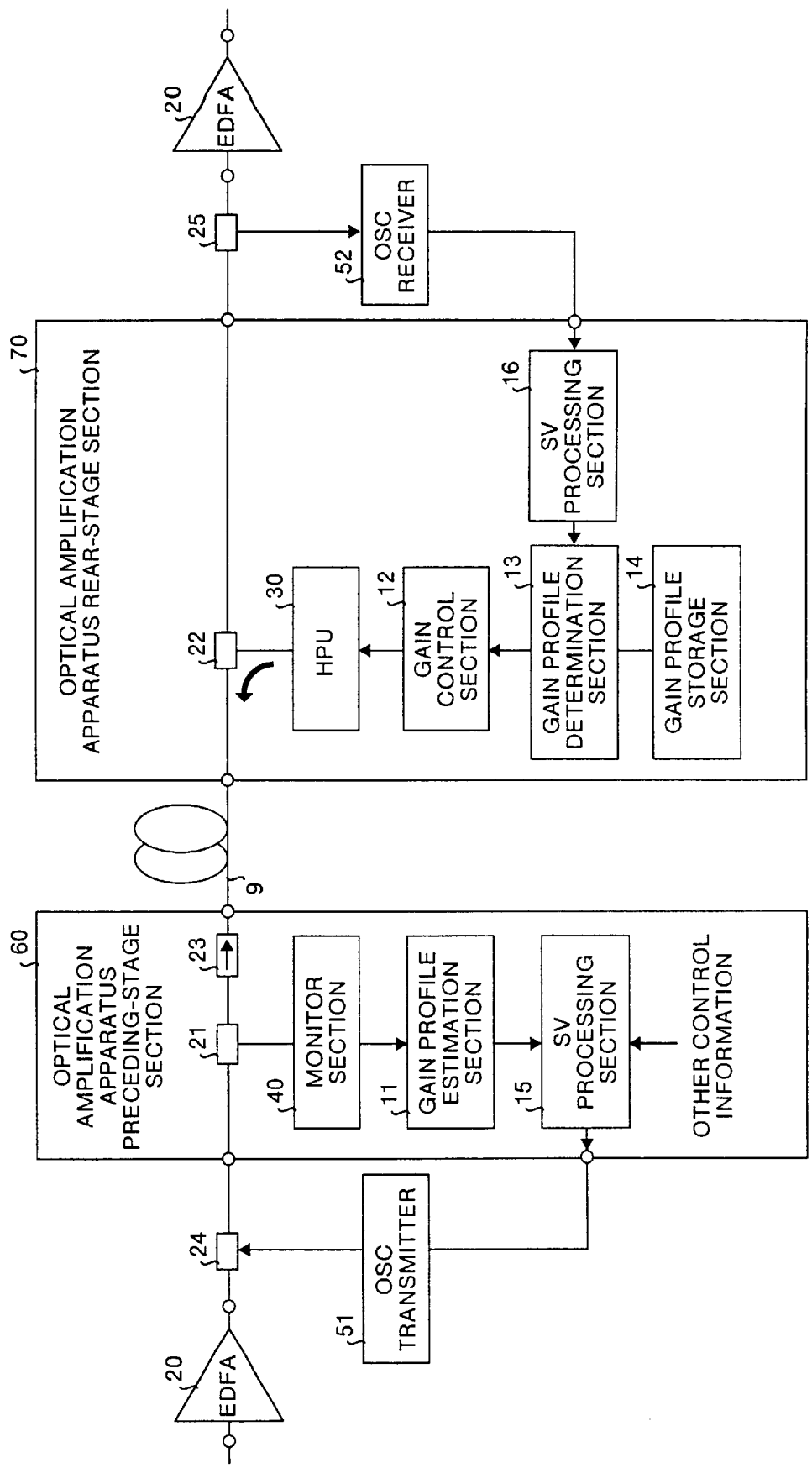
FIG. 7 is a block diagram showing a schematic structure of an optical amplification apparatus and an optical transmission system using the optical amplification apparatus according to a second embodiment of this invention.

FIG. 7 is a block diagram showing the schematic structure of the optical amplification apparatus and optical transmission system according to the second embodiment of this invention. In FIG. 7, the same legends are assigned to those common to the sections of FIG. 1, and explanation is omitted. A different point from FIG. 1 in the optical amplification apparatus and the optical transmission system shown in FIG. 7 is such that the optical amplification apparatus as explained in the first embodiment is separated into an optical amplification apparatus preceding-stage section 60 and an optical amplification apparatus rear-stage section 70 to be disposed between two EDFAs 20. More specifically, the optical amplification apparatus preceding-stage section 60 is disposed immediately after the preceding-stage EDFA 20, and the optical amplification apparatus rear-stage section 70 is disposed immediately before the next-stage EDFA 20.

The optical transmission system as shown in FIG. 7 comprises the OSC (Optical Supervisory Channel) transmitter 51 that transmits an SV signal indicating control information, optical multiplexer 24 that transmits the SV signal output from the OSC transmitter 51 to the transmission line 9, OSC receiver 52 that receives the SV signal, and the optical tap 25 that introduces the SV signal on the transmission line 9 into the OSC receiver 52.

In FIG. 7, the optical amplification apparatus preceding-stage section 60 comprises the optical tap 21, monitor section 40, and the gain profile estimation section 11 out of the components for the optical amplification apparatus as explained in the first embodiment, and further comprises the optical isolator 23 and the SV processing section 15. The optical isolator 23 is a unit to cut off a return light such as pumping light, and the SV processing section 15 is a unit to shape an estimation gain profile estimated in the gain profile estimation section 11 so as to be transmittable as the SV signal. This SV processing section 15 is also capable of receiving control information such as faulty device information other than the estimation gain profile, and transmitting the information to the OSC transmitter 51.

The optical amplification apparatus rear-stage section 70 comprises the optical multiplexer 22, HPU 30, gain control section 12, gain profile determination section 13, and the gain profile storage section 14 out of the components for the optical amplification apparatus as explained in the first embodiment, and further comprises the SV processing section 16. The SV processing section 16 is a unit that extracts the estimation gain profile from the SV signal received by the OSC receiver 52.

The optical transmission system according to the first embodiment is characterized in that this system acquires a value of signal light power of the signal light before being subjected to Raman amplification, and controls gain of the HPU 30 based on the value of the acquired signal light power. When this characteristic is applied to the optical transmission system in which Raman amplification is performed based on backward pumping, like the structure explained above, it is required to divide the optical amplification apparatus into the optical amplification apparatus preceding-stage section 60 and the optical amplification apparatus rear-stage section 70, and dispose one of these two at a position immediately after the EDFA 20 positioned on the rear side and dispose the other at a position immediately before the EDFA 20 positioned on the front side.

Accordingly, the operation of the optical amplification apparatus and the optical transmission system according to the second embodiment is performed in the same manner as explained in the first embodiment except the point such that the estimation gain profile estimated in the gain profile estimation section 11 is input into the gain profile determination section 13 through the SV processing section 15, OSC transmitter 51, OSC receiver 52, and the SV processing section 16.

As explained above, according to the optical amplification apparatus and the optical transmission system of the second embodiment, even when Raman amplification is performed based on the backward pumping, the same advantageous effect as that of the first embodiment can be obtained.

An optical amplification apparatus and an optical transmission system using the optical amplification apparatus according to a third embodiment will be explained below. The optical amplification apparatus and optical transmission system according to the second embodiment perform Raman amplification based on backward pumping on the optical transmission system with the EDFAs. On the other hand, the optical amplification apparatus and optical transmission system according to the third embodiment are characterized in that they perform Raman amplification based on the backward pumping that is applicable particularly to an optical transmission system without using the EDFA.

Figure 8:
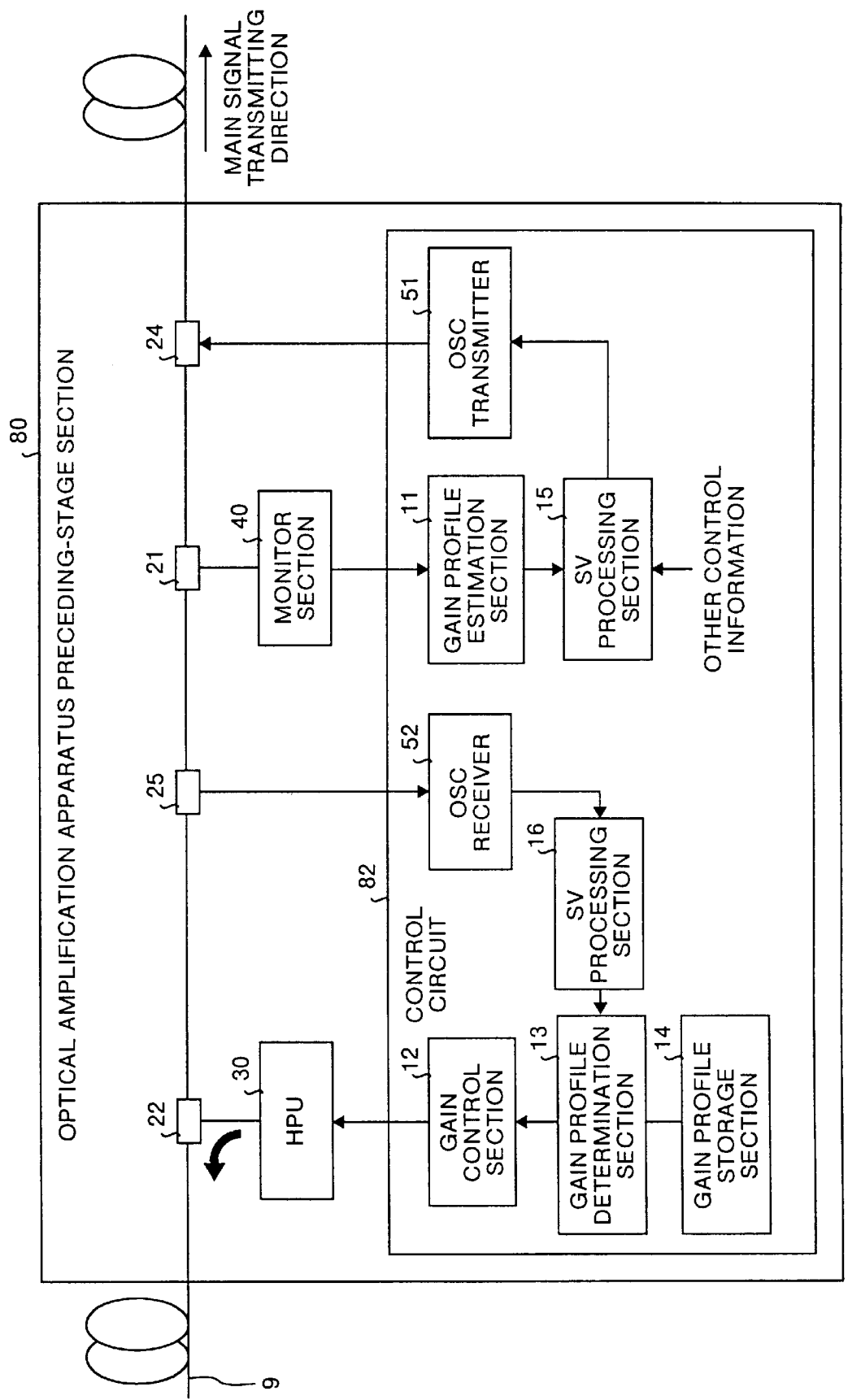
FIG. 8 is a block diagram showing a schematic structure of an optical amplification apparatus and an optical transmission system using the optical amplification apparatus according to a third embodiment of this invention.
Figure 9:
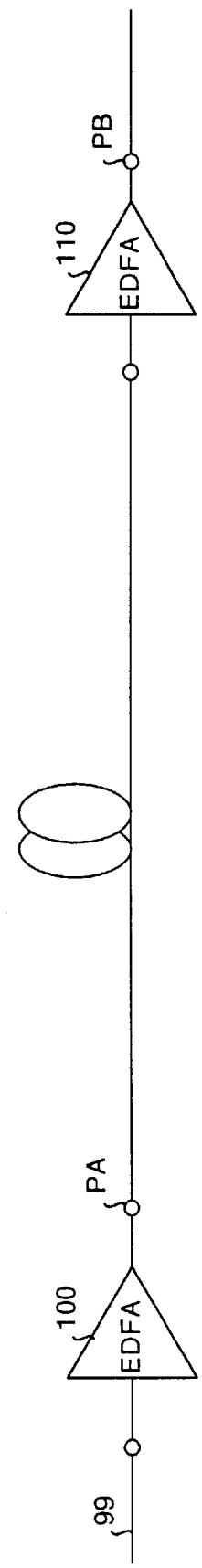
FIG. 9 is a block diagram showing a schematic structure of the conventional WDM system.
Figure 10:
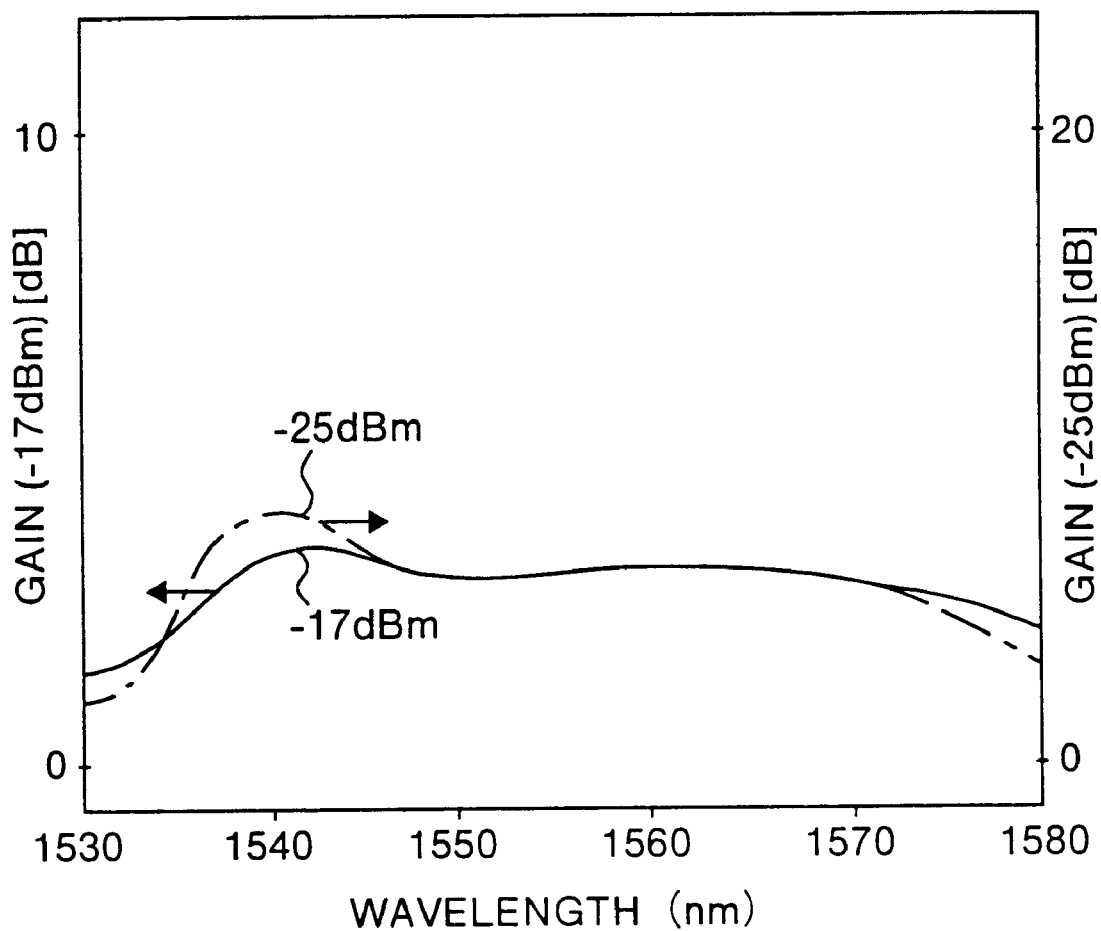
FIG. 10 shows a diagram for explaining a gain profile in the conventional EDFA.
Figure 11A:
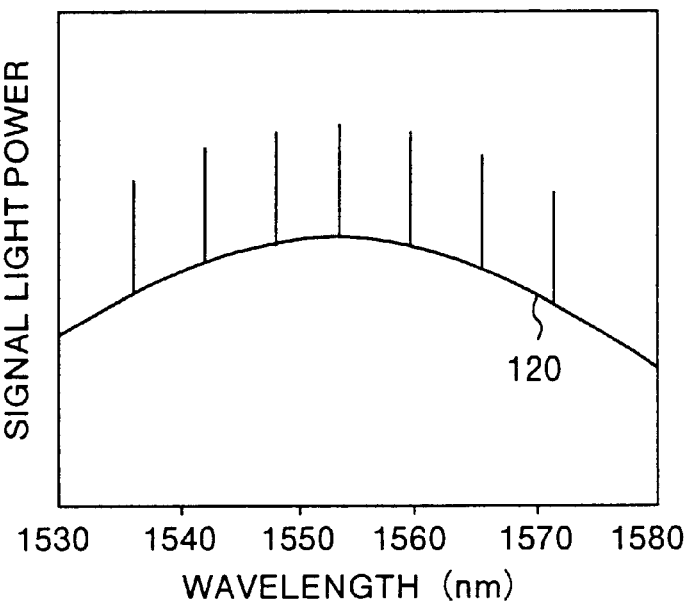
FIG. 11A and FIG. 11B show diagrams for explaining the problems of the conventional WDM system.
Figure 11B:
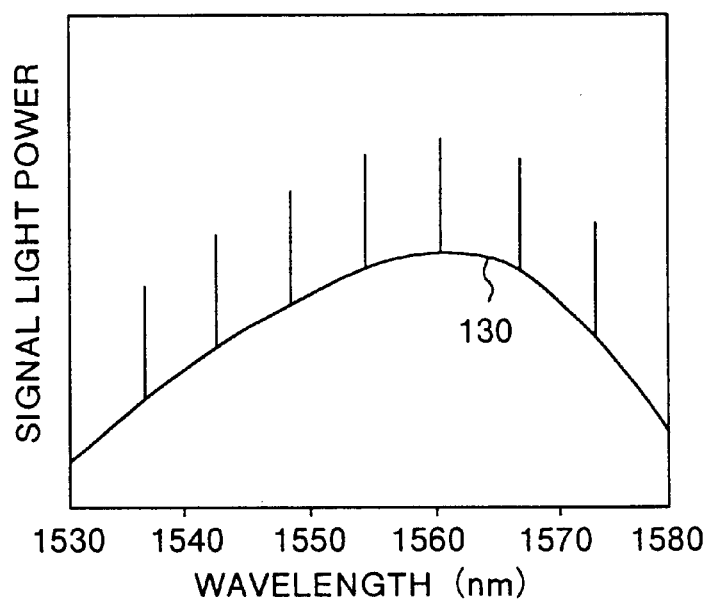

FIG. 8 is a block diagram showing the schematic structure of the optical amplification apparatus and optical transmission system according to the third embodiment of this invention. In FIG. 8, the same legends are assigned to those common to the sections of FIG. 7, and explanation is omitted. A different point from FIG. 7 in the optical amplification apparatus and the optical transmission system shown in FIG. 8 is such that the optical amplification apparatus preceding-stage section 60 and the optical amplification apparatus rear-stage section 70 are integrated into the optical amplification apparatus 80.

Accordingly, the control circuit 82 shown in FIG. 8 performs gain control for the HPU 30 based on monitor information obtained in the monitor section 40 of the optical amplification apparatus 80 as its own station and control information transmitted from the optical amplification apparatus 80 as a preceding station not shown.

In order to maintain the most adequate transmission quality, as explained in the first embodiment, it is required to satisfy two requirements as follows. One of the requirements is that optical power of a signal light in each channel in the respective stations (optical amplification apparatuses 80) on the transmission line 9 should be not less than a specified value. The other requirement is that deviation of the optical power between signal lights in each channel in the respective stations should be not more than a specified value.

In order to satisfy the former requirement, the gain due to Raman amplification needs to be sufficient. In particular, Raman amplification gain enough to compensate for propagation loss of the transmission line 9 is required particularly in the system that does not concurrently use other optical amplifier such as the EDFA. In order to satisfy the latter requirement, Raman amplification gain is required to be substantially constant with respect to signal light in each wavelength (channel). That is, it is necessary that the Raman amplification gain is substantially constant no matter what the wavelength of signal light may be.

The control circuit 82 shown in FIG. 8 can carry out the method as follows other than the gain control method explained in the first embodiment. More specifically, the control circuit 82 calculates an effective gain, i.e. (gain due to optical amplification)—(propagation loss due to the transmission line), in the signal light in wavelengths (channels) from the monitor information obtained in the monitor section 40 of the optical amplification apparatus 80 as its own station and the control information (the number of wavelengths and optical power of each signal light in the wavelengths) transmitted from the optical amplification apparatus 80 as the preceding station. The control circuit 82 then calculates a wavelength and power of the pumping light so that the above-obtained value becomes not less than a specified value (e.g., 0 dB) and the gain deviation between the signal lights in the wavelengths is not more than a specified value (e.g., 1 dB), and outputs an instruction to the HPU 30 so as to realize the calculated wavelength and power.

As explained above, according to the optical amplification apparatus and the optical transmission system of the third embodiment, even when the Raman amplification based on the backward pumping is performed in the optical transmission system that does not concurrently use other optical amplifier such as the EDFA, the same advantageous effect as that of the first embodiment can be obtained.

In the first to third embodiments, the monitor section 40 monitors optical power of the signal light in the wavelengths. However, an OSNR (Optical Signal to Noise Ratio) in each wavelength may be monitored. Accordingly, it is also possible to selectively and intensively amplify a signal light for a channel (e.g., a channel whose bit rate is higher than the other channels) requiring a high OSNR.

According to the optical amplification apparatus as one aspect of this invention, the Raman amplification is performed on the multiplexed signal light propagating through the transmission line so that gain deviation between multiplexed wavelengths becomes a minimum. Therefore, the signal light having power showing a flat profile can be input into the optical amplification apparatus such as the lumped amplifier in the next stage. Accordingly, there is an advantageous effect that it is possible to reduce accumulation of the gain deviation.

According to the optical transmission system as another aspect of this invention, by providing the optical amplification apparatus between the lumped amplifiers in the optical transmission system structured with the lumped amplifiers such as the conventional EDFAs, the lumped amplifier in the next stage can always perform uniform amplification over the multiple wavelengths. Therefore, the gain deviation can be prevented from accumulation as the number of repeating stages increases like in the conventional way. Thus, the transmission distance of the signal light can be extended to a long distance based on a double gain by the lumped amplifier and the distributed optical amplifier.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical transmission system which has at least two stations each with a pumping light source provided on a transmission line, connects a pumping light output from said pumping light source to the transmission line in the respective stations, and performs Raman amplification on wavelength multiplexed signal light transmitted through said transmission line, wherein each of said stations monitors a number of wavelengths of a signal light and optical power of each signal light in each of the wavelengths, or monitors a number of wavelengths of a signal light and a noise ratio with respect to each signal light in each of the wavelengths, acquires information for these data, and transmits the acquired information to a next station using a channel except a channel for transmission of signal light, and said next station, which receives the information transmitted from a preceding station, controls the wavelength and power of the pumping light output from said pumping light source based on the received information and the information acquired by its own station.

2. An optical amplification apparatus comprising:

a demultiplexing unit that demultiplexes multiplexed signal light propagating through a transmission line;

a monitor unit that detects signal light power in all of or a part of the multiplexed wavelengths of the signal light demultiplexed by said demultiplexing unit;

an estimation unit that estimates a deviation of power distribution of the signal light over all in the multiplexed wavelengths based on the signal light power in each wavelength detected by said monitor unit;

a gain profile determination unit that determines a gain profile indicating Raman gain control information, that minimizes the deviation of the signal light power distribution estimated by said estimation unit, from a plurality of previously stored gain profiles; and a pumping light source that outputs a pumping light of intensity according to the gain profile determined by said gain profile determination unit, to said transmission line.

3. An optical transmission system structured by providing a plurality of optical amplifiers performing Raman amplification on a transmission line, said optical transmission system comprising;

a signal light information transmitter that transmits a control signal light to said transmission line;

a signal light information receiver that receives the control signal light; and an optical amplification apparatus that demultiplexes multiplexed signal light propagating through the transmission line, detects signal light power in all of or a part of the multiplexed wavelengths of the demultiplexed signal light, estimates a deviation of power distribution of the signal light over all in the multiplexed wavelengths based on the detected signal light power in each wavelength, transmits the deviation of the estimated signal light power distribution included in the information for the control signal light, extracts the deviation of the signal light power distribution from the control signal light received by said signal light information receiver, determines a gain profile indicating Raman gain control information, that minimizes the deviation of the extracted signal light power distribution, from a plurality of previously stored gain profiles, and outputs a pumping light of intensity according to the determined gain profile to said transmission line.

4. The optical transmission system according to claim 3, wherein said signal light information transmitter is an OSC (Optical Supervisory Channel) transmitter, and said signal light information receiver is an OSC receiver.

5. An optical transmission system having a plurality of lumped amplifiers on a transmission line, said optical transmission system comprising:

an optical amplification apparatus disposed on said transmission line between said lumped amplifiers, which receives a multiplexed signal light amplified by said lumped amplifier in a previous stage and performs Raman amplification on the received signal light by a gain with which deviation of the signal light power between the multiplexed wavelengths becomes a minimum, the optical amplification apparatus including:

a demultiplexing unit that demultiplexes multiplexed signal light that propagates through said transmission line;

a monitor unit that detects signal light power in all of or a part of the multiplexed wavelengths of the signal light demultiplexed by said demultiplexing unit;

an estimation unit that estimates a deviation of power distribution of the signal light over all in the multiplexed wavelengths based on the signal light power in each wavelength detected by said monitor unit;

a gain profile determination unit that determines a gain profile indicating Raman gain control information, that minimizes the deviation of the signal light power distribution estimated by said estimation unit, from a plurality of previously stored gain profiles; and a pumping light source that outputs a pumping light of intensity according to the gain profile determined by said gain profile determination unit.

6. The optical transmission system according to claim 5, wherein said lumped amplifier is an erbium-doped fiber amplifier.

7. An optical transmission system instructed by providing a plurality of lumped amplifiers on a transmission line, said optical transmission system comprising;
- a signal light information transmitter that transmits a control signal light to said transmission line;
- a signal light information receiver that receives the control signal light;
- a first optical amplification apparatus that demultiplexes multiplexed signal light propagating through said transmission line, detects signal light power in all of or a part of the multiplexed wavelengths of the demultiplexed signal light, estimates a deviation of power distribution of the signal light over all in the multiplexed wavelengths based on the detected signal light power in each wavelength, and transmits the deviation of the estimated signal light power distribution included in the information for the control signal light to said signal light information transmitter; and
- a second optical amplification apparatus that extracts the deviation of the signal light power distribution from the control signal light received by said signal light information receiver, determines a gain profile indicating Raman gain control information, that minimizes the deviation of the extracted signal light power distribution, from a plurality of previously stored gain profiles, and outputs a pumping light of intensity according to the determined gain profile to said transmission line.

8. The optical transmission system according to claim 7, wherein said signal light information transmitter is an OSC (Optical Supervisory Channel) transmitter, and said signal light information receiver is an OSC receiver.

9. The optical transmission system according to claim 7, wherein said lumped amplifier is an erbium-doped fiber amplifier.

10. The optical transmission system according to claim 9, wherein said signal light information transmitter is an OSC (Optical Supervisory Channel) transmitter, and said signal light information receiver is an OSC receiver.

* * * * *